US011310973B2

United States Patent
Ruskin

(10) Patent No.: US 11,310,973 B2
(45) Date of Patent: Apr. 26, 2022

(54) METHOD TO IRRIGATE USING HYDROGELS IN THE SOIL TO DRAW WATER FROM THE ATMOSPHERE

(71) Applicant: A.I. INNOVATIONS N.V., Corte Madera, CA (US)

(72) Inventor: Rodney Ruskin, San Rafael, CA (US)

(73) Assignee: A.I. INNOVATIONS N.V., Corte Madera, CA (US)

( * ) Notice: Subject to any disclaimer, the term of this patent is extended or adjusted under 35 U.S.C. 154(b) by 0 days.

(21) Appl. No.: 15/931,450

(22) Filed: May 13, 2020

(65) Prior Publication Data
US 2020/0359584 A1 Nov. 19, 2020

Related U.S. Application Data

(60) Provisional application No. 62/848,467, filed on May 15, 2019.

(51) Int. Cl.
| | | |
|---|---|---|
| *A01C 23/04* | (2006.01) | |
| *A01G 29/00* | (2006.01) | |
| *A01G 25/06* | (2006.01) | |
| *E03B 3/28* | (2006.01) | |

(52) U.S. Cl.
CPC ............ *A01G 29/00* (2013.01); *A01C 23/042* (2013.01); *A01G 25/06* (2013.01); *E03B 3/28* (2013.01)

(58) Field of Classification Search
CPC ........ A01G 25/00; A01G 25/06; A01G 29/00; A01C 23/042
See application file for complete search history.

(56) References Cited

U.S. PATENT DOCUMENTS

| | | | | |
|---|---|---|---|---|
| 4,057,933 A | * | 11/1977 | Enyeart | A01G 27/00 47/79 |
| 4,145,208 A | | 3/1979 | Gulko et al. | |
| 5,185,024 A | | 2/1993 | Siemer et al. | |
| 5,303,663 A | * | 4/1994 | Salestrom | A01B 17/00 111/118 |
| 5,382,270 A | | 1/1995 | Graham et al. | |
| 6,890,126 B2 | | 5/2005 | Mazzei | |
| 2003/0097864 A1 | * | 5/2003 | Montes | C05C 3/00 71/57 |
| 2003/0196375 A1 | | 10/2003 | Ferro | |
| 2016/0192600 A1 | | 7/2016 | Bhatt et al. | |
| 2018/0014476 A1 | * | 1/2018 | Shah | A01G 24/00 |
| 2018/0279567 A1 | * | 10/2018 | Stolze | A01G 9/088 |
| 2018/0338437 A1 | * | 11/2018 | Jung | A01G 25/06 |

OTHER PUBLICATIONS

Zhao, Fei et al.; Super Moisture-Absorbent Gels for All-Weather Atmospheric Water Harvesting; Jan. 11, 2019 (Year: 2019).*
Li, Renyuan et al.; "Hybrid Hydrogel with High Water Vapor Harvesting Capacity for Deployable Solar-Driven Atmospheric Water Generator"; Sep. 7, 2018 (Year: 2018).*
(Continued)

*Primary Examiner* — Benjamin F Fiorello
(74) *Attorney, Agent, or Firm* — Lewis Roca Rothgerber Christie LLP

(57) ABSTRACT

Provided is a method of delivering water to a root system of a crop, the method including causing the crop to be adjacent to, or in a region of, soil containing hydrogel, and delivering air to the hydrogel.

23 Claims, 3 Drawing Sheets

(56) References Cited

OTHER PUBLICATIONS

Combined International Search Report and Written Opinion; International Application Serial No. PCT/US20/32740; dated Aug. 12, 2020; 8 pages.
Goorahoo et al.; Using Air in Sub-Surface Drip Irrigation (SDI) to Increase Yields in Bell Peppers; Center for Irrigation Technology (CIT) and Mazzei Injector Corp.; Jan. 2002, pp. 22-28, 51-52.
Ruskin et al.; Applications of Subsurface Drip Dispersal Technology in Engineered Ecological Systems; WEFTEC © 2004; 8 pages.
International Preliminary Report on Patentability; Application Serial No. PCT/US2020/032740, dated May 20, 2021, 20 Sheets.

\* cited by examiner

METHOD TO IRRIGATE USING HYDROGELS IN THE SOIL TO DRAW WATER FROM THE ATMOSPHERE

CROSS-REFERENCE TO RELATED APPLICATION(S)

This patent application claims priority to and the benefit of U.S. Provisional Application Ser. No. 62/848,467, filed on May 15, 2019, and entitled METHOD TO IRRIGATE USING HYDROGELS IN THE SOIL TO DRAW WATER FROM THE ATMOSPHERE, the entire contents of which being incorporated herein by reference.

FIELD

This invention relates generally to methods and systems for providing irrigation using hydrogels in soil to draw water from ambient air into the soil to be provided to vegetation.

BACKGROUND

Driplines, or irrigation lines, of an irrigation system may be used to deliver water to plants, crops, vegetation, trees, and/or other foliage. Additionally, hydrogels may be placed in the vicinity of a root system of the plants, crops, vegetation, trees, and/or other foliage (e.g., may be placed in the soil) to improve delivery of the water to the root system.

A hydrogel is a network of polymer chains that are hydrophilic, meaning the polymer chains tend to mix with, dissolve in, or be wetted by, water in the vicinity thereof. Such a network of polymer chains may be formed as a colloidal gel in which water is the dispersion medium.

A three-dimensional solid may be formed by the hydrophilic polymer chains being held together by cross-links. The three-dimensional network of hydrophilic polymers may swell when submerged in water due to their hydrophilic nature. That is, the three-dimensional network may hold a relatively large amount of water while maintaining structure due to chemical or physical cross-linking of the individual polymer chains.

Because of inherent cross-links between the polymer chains of hydrogels, the structural integrity of a hydrogel network of some hydrogels might not readily dissolve even despite absorbing a high concentration of water. For example, hydrogels may be highly absorbent natural or synthetic polymeric networks (e.g., may be over 90% water when saturated).

SUMMARY

Embodiments described herein provide improvements to agriculture and landscape technology.

According to embodiments of the present disclosure, there is provided a method of delivering water to a root system of a crop, the method including causing the crop to be adjacent to, or in a region of, soil containing hydrogel, and delivering air to the hydrogel.

The method may further include mixing an amount of the hydrogel with an amount of the soil to produce the soil containing the hydrogel, wherein causing the crop to be adjacent to, or in the region of, the soil containing the hydrogel includes planting the crop or a seed in, or adjacent to, the soil containing the hydrogel.

Delivering the air to the hydrogel may include forcing the air through tubing in the soil.

The tubing in the soil may be located beneath the soil containing the hydrogel.

The method may further include delivering the hydrogel to the region of soil by forcing the hydrogel through first tubing in the soil.

Forcing the hydrogel through the first tubing may include pumping the hydrogel with a pump.

The pump may include a modified fertilizer pump that is configured to pump the hydrogel.

Delivering air to the hydrogel may include forcing the air through second tubing located in the soil beneath the first tubing.

The method may further include delivering the hydrogel to the region of soil by forcing the hydrogel through tubing in the soil, wherein delivering the air to the hydrogel includes forcing air through the tubing.

The tubing in the soil may include a dripline of an irrigation system.

The method may further include mixing water with the air, and delivering the water and the air to the hydrogel.

The method may further include delivering any one of water, nanoclay, agricultural chemicals, and/or plant nutrients to a region adjacent the crop.

The hydrogel, the air, and the any one of the water, the nanoclay, the agricultural chemicals, and the plant nutrients may be delivered to the region adjacent the crop via a common dripline of an irrigation system.

According to other embodiments of the present disclosure, there is provided a method of crop irrigation, the method including delivering a hydrogel to a region of soil via a dripline, and delivering air containing moisture to the region of the soil via the dripline to enable the hydrogel to absorb the moisture.

According to yet other embodiments of the present disclosure, there is provided a method of crop irrigation using an irrigation system including one or more driplines, the method including delivering hydrogel through the one or more driplines to a region of soil, and delivering air to the hydrogel through the one or more driplines.

The hydrogel may be delivered to the region of soil through a first dripline of the one or more driplines, and the air may be delivered to the hydrogel through a second dripline of the one or more driplines.

The second dripline may be located beneath the first dripline.

Delivering the hydrogel through the one or more driplines to a region of soil may include pumping the hydrogel with a pump of the irrigation system.

The method may further include modifying a fertilizer pump of the irrigation system, and delivering the hydrogel through the one or more driplines to a region of soil may include pumping the hydrogel with the fertilizer pump.

Accordingly, embodiments of the present disclosure are able to use a slightly modified subsurface drip irrigation system to deliver both hydrogel and air to soil via the driplines of the irrigation system, thereby enabling the hydrogel to absorb moisture from the air, and in turn enabling a root structure in the vicinity of the driplines to absorb the moisture captured by the hydrogel.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1:
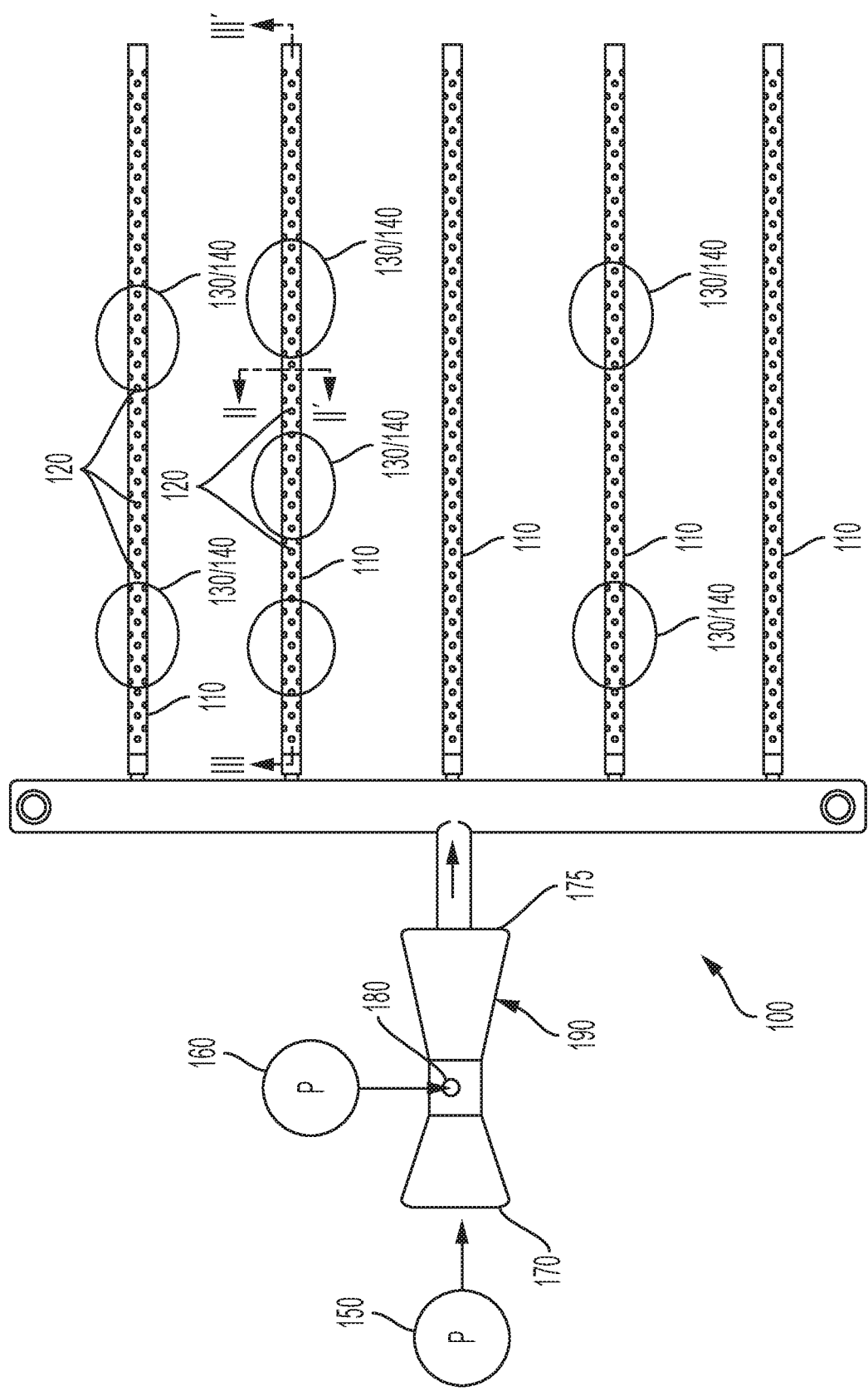
FIG. 1 depicts a plan view of an irrigation system according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some embodiments of the present disclosure provide a mechanism for pumping air, water, nutrients, gypsum, nanoclay, fertilizer, and/or hydrogels through a common dripline or irrigation line for above ground or sub-surface drip applications (e.g., through a common dripline or irrigation line for providing nutrients and/or water to foliage, which may be either above ground or in ground).

As mentioned above, hydrogels have the ability to soak up and hold moisture. Accordingly, an amount of hydrogel may swell when submerged in water. Furthermore, some hydrogels may capture an amount of water when exposed to air having humidity. That is, some hydrogels may soak up moisture from exposure to humid air. Additionally, when hydrogels are placed near a root structure, the root system is able to slowly extract the water from the hydrogels.

However, simply pouring a hydrogel on the ground may not allow the hydrogel to effectively penetrate into the soil. Further, hydrogels generally have an expected lifespan of, roughly, around four to five years once placed in soil. Moreover, hydrogels are generally expensive. Accordingly, hydrogels may be more practical for annual crops, as it may not be feasible to dig around, or uproot, a tree to provide additional hydrogel after four to five years have passed and the initial hydrogel has lost some of its effectiveness.

Accordingly, there has conventionally been some degree of effort and expense to effectively distribute hydrogels in soil to be effectively used by an intended crop, and to maintain a desired amount of hydrogel in the soil over time. Accordingly, there may be some benefit provided by some embodiments of the present disclosure wherein hydrogels may be added to soil through a subsurface drip irrigation system. That is, some hydrogels may be injected in a manner similar to the injection of fertilizer into a dripline according to some embodiments of the present disclosure. By using a subsurface drip system to add hydrogel to the soil, depleted amounts of hydrogel that may be otherwise lost over time may be replaced without additional capital costs.

Furthermore, because hydrogels may be used to separate water moisture from air passing through, or in proximity to, the hydrogels, some embodiments of the present disclosure provide a method and structure for providing air through the subsurface drip irrigation system. That is, the same dripline that is used to inject hydrogels into nearby soil, or even a different dripline, may be used to deliver air to areas of the soil including the hydrogels. Accordingly, a single common dripline that may be used to initially deliver one or more hydrogels, and thereafter may be used to deliver air. Because air flowing from the drip emitter of the dripline may be delivered to move past, over, or through the hydrogel that is added to the soil via the same dripline, the hydrogel may absorb water present in the air in the form of water vapor/humidity. Accordingly, the hydrogels may absorb moisture from the air provided by the drip irrigation system such that nearby vegetation may have access to the moisture absorbed and held by the hydrogels.

Figure 2:
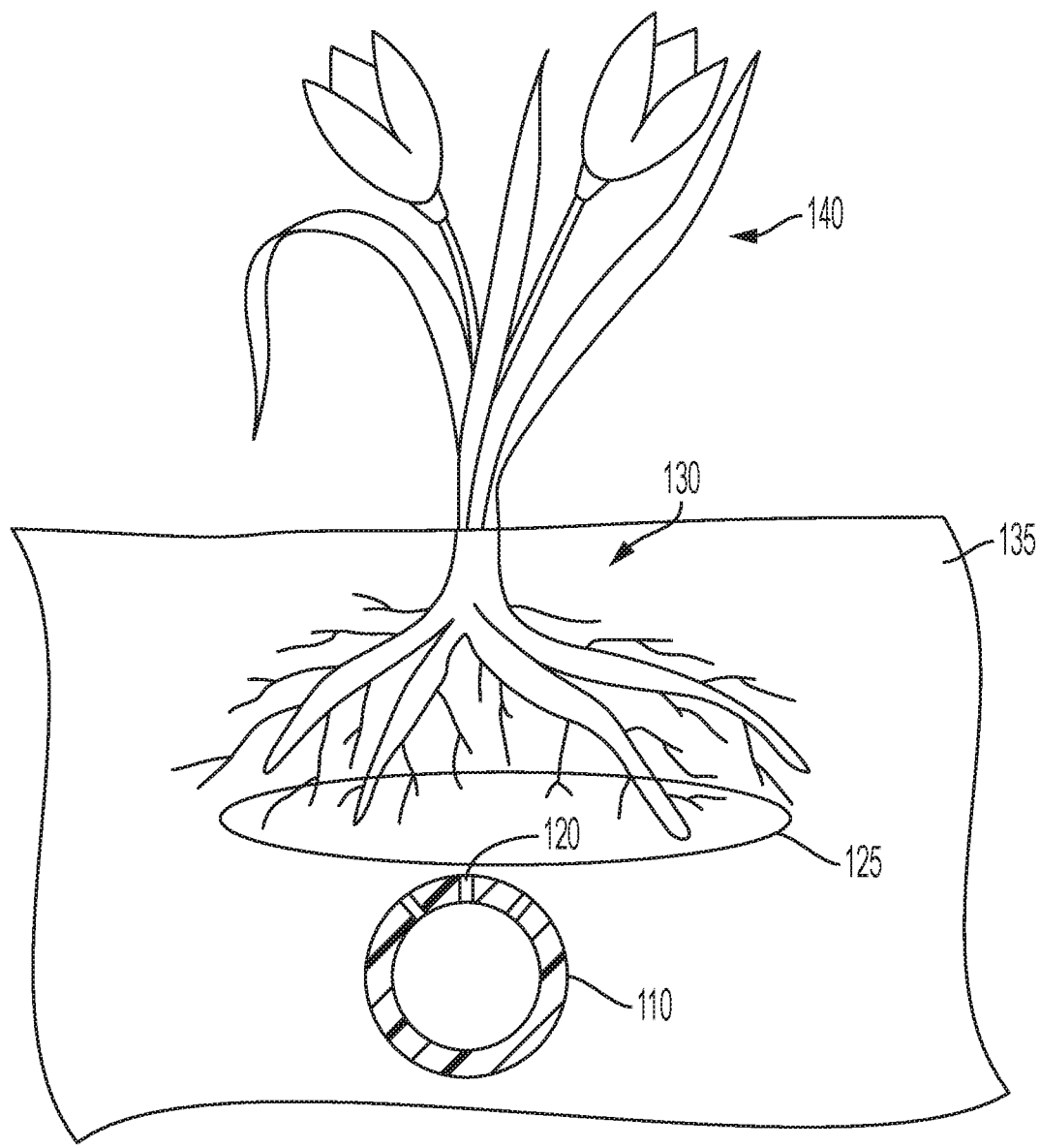
FIG. 2 depicts a cross-sectional view of a portion of the irrigation system of FIG. 1 taken along the line II-II'.

FIG. 1 depicts a plan view of an irrigation system according to some embodiments of the present disclosure. FIG. 2 depicts a cross-sectional view of a portion of the irrigation system of FIG. 1 taken along the line FIG. 3 depicts a cross-sectional view of a portion of the irrigation system of FIG. 1 taken along the line III-III'.

Figure 3:
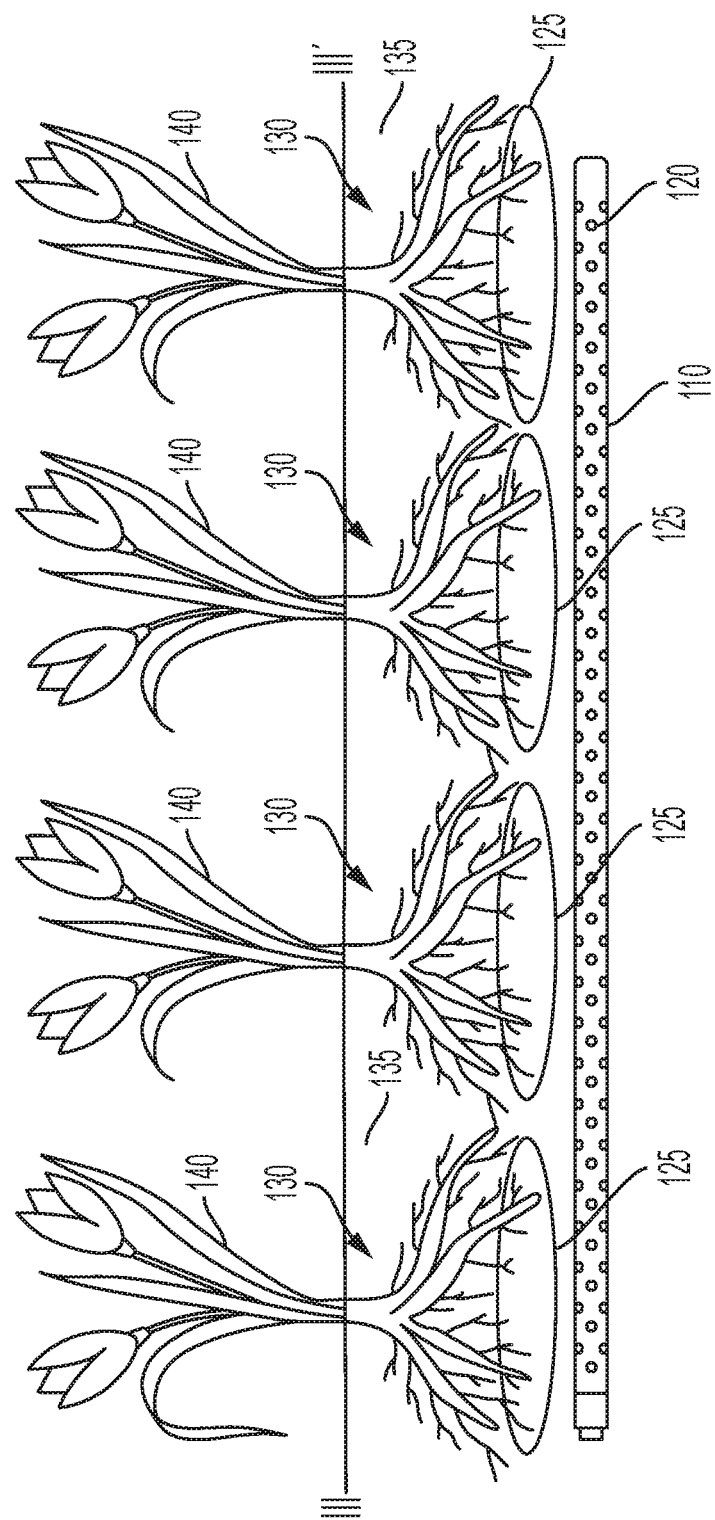
FIG. 3 depicts a cross-sectional view of a portion of the irrigation system of FIG. 1 taken along the line III-III'.

Referring to FIGS. 1, 2, and 3, an irrigation system 100 according to some embodiments of the present disclosure includes a plurality of driplines 110, each of which having one or more drip emitters 120, for delivering water, nutrients, gypsum, nanoclay, agricultural chemicals, hydrogels, and/or air to respective root systems 130 of corresponding crops or vegetation 140. As used herein, the term "crop" or "crops" may refer to anything in the plant kingdom (plants, flower, trees, vegetation foliage, etc.). The irrigation system 100 may have a first inlet 170 connected to a water source (e.g., a water pump) 150, which is in turn connected to an outlet 175 for delivering water to the vegetation 140 via the driplines 110.

The irrigation system 100 may also have a second inlet 180 that is coupled to a source (e.g., a pump or injector) 160 for delivering nutrients, gypsum, nanoclay, agricultural chemicals, hydrogels, and/or air to the vegetation 140 via the driplines 110. In some embodiments, the first inlet 170 and the second inlet 180 may be connected to a mixer 190 that may be used to mix water with, for example, air before passing the mixture through the outlet 175 and through the driplines 110.

It should be noted that other embodiments of the present disclosure may include a mixer having multiple inlets and multiple pumps and/or injectors for respectively delivering the various materials (e.g., hydrogels and air) to the driplines 110. Further, the mixer 190, the inlets 170 and 180, and/or the sources 150 and 160 may be controlled such that the various materials (e.g., water, air, and hydrogels) may be delivered to the driplines 110 one at a time. Moreover, gypsum, nanoclay, and/or other agricultural chemicals may be added to a hydrogel material or to mixture containing hydrogel and water to be delivered via the driplines 110. Accordingly, the hydrogel could act as a carrier of agricultural chemicals delivered by dripline 110 to be delivered to the root systems 130 of the vegetation 140.

Accordingly, one or more hydrogels and air may be delivered to the vegetation 140 via the same outlet 175 and via the same driplines 110 that may be used for delivering water (e.g., via the same drip emitters 120). Accordingly, some embodiments of the present disclosure enable the delivery of hydrogel via an existing dripline 110 of an irrigation system 100 to a region 125 in soil 135 (see FIGS. 2 and 3) that is adjacent the root system 130 of the plant 140.

Because a root system 130 in the vicinity of the region 125 of the soil 135 to which the hydrogel is delivered may absorb water that is held by the hydrogel, by delivering air from the atmosphere to the hydrogel, the irrigation system 100 of some of the embodiments may reduce or eliminate the need to deliver as much liquid water, or even any liquid water at all, from the water source 150 for the purpose of ensuring that the root structure 130 receives a sufficient amount of hydration, as the hydrogel is able to absorb moisture from the air. Accordingly, the irrigation system 100 may eliminate the need for a redundant dripline that would otherwise be used solely for the purpose of delivering water.

Further, in accordance with the embodiments shown in FIGS. 1, 2, and 3 and/or with other embodiments of the present disclosure, before planting the vegetation 140 in the soil 135, dry hydrogel (e.g., hydrogel that has not yet been exposed to moisture to thereby absorb water) may be plowed into the soil 135 to be mixed therewith. The hydrogel may be mixed with the soil 135 at around the same times as, before, or after the placement of a single dripline 110 in the soil in the area (e.g., the single dripline may be placed below the hydrogel-soil mixture). Thereafter, once a crop 140 is planted to have its root system(s) 130 near the hydrogel-soil mixture for the purpose of receiving the benefit of the water retained by the hydrogel, air may be added through the single buried drip irrigation line 110 therebelow to provide the region 125 containing the hydrogel with a feed of water vapor that is contained in the air, such that the hydrogel may absorb the water vapor, and such that the root system 130 of the planted crop 140 may thereafter absorb the water held by the hydrogel.

Although dry hydrogel may be mixed with soil 135, it may be noted that adding hydrogel via the one or more driplines 110 may more effectively provide water and/or nutrients to a root system 130 than simply surrounding a dripline with hydrogel when placing the dripline in the soil 135, and thereafter providing only water (e.g., without hydrogel) through the dripline.

Further, although the embodiments shown in FIGS. 1, 2, and 3 depict an irrigation system 100 with a single dripline 110 for each row of crops 140, it should be noted that other embodiments of the present disclosure may provide an irrigation system that includes two driplines for a row. For example, a first dripline may be used to deliver hydrogel into the soil (e.g., to deliver hydrogel to a region in soil that is in the vicinity of a root system), and a second, adjacent dripline may be used to deliver air that may pass over or through the hydrogel that is deposited in the soil. In some embodiments, the orientation of the driplines may be such that the second dripline for delivering air may be placed beneath the first dripline for delivering the hydrogel (e.g., beneath the first dripline in a gravity direction). For example, by delivering air below an area in which the hydrogel is applied, the air may travel upwardly to pass through the hydrogel, thereby enabling more effectively utilization of the hydrogel. In yet other embodiments, multiple driplines may be used for delivering hydrogel to a single row of crops, and/or multiple driplines may be used for delivering air to the hydrogel in a single row of crops.

Other embodiments of the present disclosure may use solar energy to power the irrigation/dripline system 100. For example, solar energy may be used to power the mixer 190, the water pump 150, and the pump/injector 160. Such embodiments may be useful in semi-desert regions with relatively large amounts of sun, in regions where the soil may be dry despite the air being relatively humid, and in regions where water may be relatively scarce. However, even if a supply of water is available, the irrigation system 100 may be operated to supplement a supply of the water to the crop 140 by injecting air into the usual irrigation flow of the driplines 110 by using the air injector 160 and the mixer 190.

Some embodiments of the present disclosure may be used with previously installed driplines and irrigation systems. For example, the pump/injector 160 may be integrated with the irrigation system, and after adding hydrogel to the soil, air may be injected via the driplines of the irrigation system, thereby reducing an amount of water that was conventionally used to meet the needs of the crop serviced by the driplines. Further, the pump/injector 160 may be, for example, a fertilizer injector that may be modified according to embodiments of the present disclosure to be used for injecting hydrogel and/or air. Accordingly, embodiments of the present disclosure could be implemented without significant additional extra capital costs.

Some embodiments of the present disclosure may be used in conjunction with various embodiments disclosed in U.S. Pat. No. 6,890,126, titled SUBSURFACE WATER/AIR IRRIGATION SYSTEM WITH PREVENTION OF AIR LOCK, the disclosure of which being incorporated herein by reference.

For example, according to embodiments of the present disclosure, air can be added into one or more driplines 110 of an irrigation system 100 by injecting air into irrigation water to provide a mixture of air and water via drip emitters 120. The air/irrigation water mixture may be provided by using one or more injection devices (e.g., the water pump 150 and the pump/injector 160). That is, a mixer/injector (e.g., the mixer 190) may be used to inject and mix gas into water to form the air/irrigation water mixture. The mixture may then flow from a header into a plurality of branches (e.g., driplines 110) of the irrigation system. The mixture may emit from drip emitters 120 of the branches to be delivered to respective root systems 130.

Accordingly, as described above, hydrogel may be added to soil, and a nearby dripline could have air pass therethrough (e.g., toward the hydrogel) such that hydrogel could extract water from the air to hold the water in liquid form. Thereafter, a nearby root structure could, in turn, extract the received water from the hydrogel material. Moreover, because using air instead of water to deliver moisture to plants using a drip system would be beneficial in desert conditions, a solar panel could be added to the system to power the pump that is used to deliver the air through the dripline. Further, one or more mixers/injectors can be used to provide a mixture of any combination of hydrogels, water, air, gypsum, nanoclay, agricultural chemicals, and/or plant nutrients in the irrigation system. Accordingly, an above ground or underground irrigation system may supply the mixture to soil that is under or near the roots of a growing crop.

Accordingly, as described above, embodiments of the present disclosure are able to provide improvements to agricultural technology by providing a method and system for providing hydrogels, water, air, gypsum, nanoclay, agricultural chemicals, fertilizer, plant nutrients, etc. in the irrigation system to crops via an irrigation system, including a method and system for providing hydrogel to a region near a root system of vegetation, and providing air to the same region such that the hydrogel may absorb moisture from the air, and such that the root system may in turn have access to the water absorbed by the hydrogel.

What is claimed is:

1. A method of delivering water to a root system of a crop, the method comprising:

causing the crop to be adjacent to, or in a region of, soil containing hydrogel; and delivering atmospheric air from a surrounding environment to the hydrogel via tubing, the air comprising water vapor that is separated from liquid water and being the primary source of moisture that is delivered to the hydrogel via the tubing, such that the hydrogel absorbs at least some of the moisture from the air, and such that the root system is able to absorb an amount of moisture absorbed by the hydrogel despite an absence of added light or added heat beyond that corresponding to an ambient temperature of the soil containing the hydrogel.

2. The method of claim 1, further comprising mixing an amount of the hydrogel with an amount of the soil to produce the soil containing the hydrogel, wherein causing the crop to be adjacent to, or in the region of, the soil containing the hydrogel comprises planting the crop or a seed in, or adjacent to, the soil containing the hydrogel.

3. The method of claim 1, wherein delivering the air to the hydrogel comprises forcing the air through the tubing in the soil.

4. The method of claim 3, wherein the tubing in the soil is located beneath the soil containing the hydrogel.

5. The method of claim 1, further comprising delivering the hydrogel to the region of the soil by forcing the hydrogel through additional tubing in the soil.

6. The method of claim 5, wherein forcing the hydrogel through the additional tubing comprises pumping the hydrogel with a pump.

7. The method of claim 6, wherein the pump comprises a fertilizer pump that is configured to pump the hydrogel.

8. The method of claim 5, wherein delivering the air to the hydrogel comprises forcing the air through the tubing located in the soil beneath the additional tubing.

9. The method of claim 1, further comprising delivering the hydrogel to the region of the soil by forcing the hydrogel through the tubing in the soil, wherein delivering the air to the hydrogel comprises forcing the air through the tubing.

10. The method of claim 9, wherein the tubing in the soil comprises a dripline of an irrigation system.

11. The method of claim 1, further comprising:

mixing additional water vapor with additional air; and delivering the additional water vapor and the additional air to the hydrogel.

12. The method of claim 1, further comprising, separately from the delivering the air to the hydrogel via the tubing, delivering any one of water, nanoclay, agricultural chemicals, and/or plant nutrients to a region adjacent the crop.

13. The method of claim 12, wherein the hydrogel, the air, and the any one of the water, the nanoclay, the agricultural chemicals, and the plant nutrients are delivered to the region adjacent the crop via a common dripline of an irrigation system.

14. A method of crop irrigation, the method comprising:
delivering a hydrogel to a region of soil via a dripline; and
delivering atmospheric air from a surrounding environment and containing moisture to the region of the soil via the dripline to enable the hydrogel to absorb the moisture, the air being separated from liquid water and being the primary source of moisture that is delivered to the hydrogel via the dripline, such that the hydrogel absorbs at least some of the moisture from the air, and such that a root system of a crop is able to absorb an amount of moisture absorbed by the hydrogel despite an absence of added light or added heat beyond that corresponding to an ambient temperature of the soil containing the hydrogel.

15. The method of claim 14, further comprising:
mixing water vapor with additional air; and
delivering the additional air to the hydrogel.

16. The method of claim 14, further comprising, separately from the delivering the air to the hydrogel via the dripline, delivering any one of water, nanoclay, agricultural chemicals, and/or plant nutrients to a region adjacent the crop.

17. A method of crop irrigation using an irrigation system comprising one or more driplines, the method comprising:
delivering hydrogel through the one or more driplines to a region of soil; and
delivering atmospheric air from a surrounding environment to the hydrogel through the one or more driplines, the air comprising water vapor that is separated from liquid water and being the primary source of moisture that is delivered to the hydrogel via the one or more driplines, such that the hydrogel absorbs at least some of the moisture from the air, and such that a root system of a crop is able to absorb an amount of moisture absorbed by the hydrogel despite an absence of added light or added heat beyond that corresponding to an ambient temperature of the soil containing the hydrogel.

18. The method of claim 17, wherein the hydrogel is delivered to the region of the soil through a first dripline of the one or more driplines, and
wherein the air is delivered to the hydrogel through a second dripline of the one or more driplines.

19. The method of claim 18, wherein the second dripline is located beneath the first dripline.

20. The method of claim 17, wherein delivering the hydrogel through the one or more driplines to the region of the soil comprises pumping the hydrogel with a pump of the irrigation system.

21. The method of claim 17, wherein delivering the hydrogel through the one or more driplines to the region of the soil comprises pumping the hydrogel with a fertilizer pump of the irrigation system.

22. The method of claim 17, further comprising:
mixing additional water vapor with additional air; and
delivering the additional water vapor and the additional air to the hydrogel.

23. The method of claim 17, further comprising, separately from the delivering the air to the hydrogel via the one or more driplines, delivering any one of water, nanoclay, agricultural chemicals, and/or plant nutrients to a region adjacent the crop.

* * * * *